Sept. 30, 1941.  V. E. BABCOCK  2,257,521

BACKLASH PREVENTER FOR FISHING REELS

Filed Nov. 1, 1940   2 Sheets-Sheet 1

Inventor
Verner E. Babcock

By Clarence A. O'Brien

Attorney

Sept. 30, 1941.  V. E. BABCOCK  2,257,521
BACKLASH PREVENTER FOR FISHING REELS
Filed Nov. 1, 1940  2 Sheets-Sheet 2
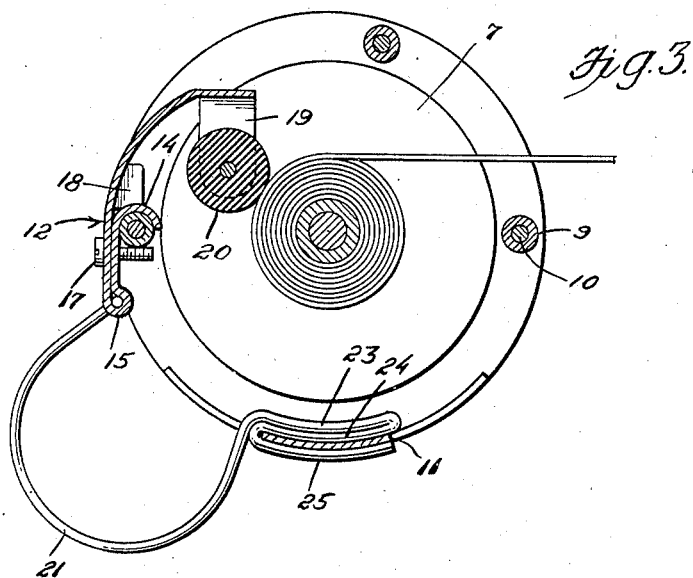
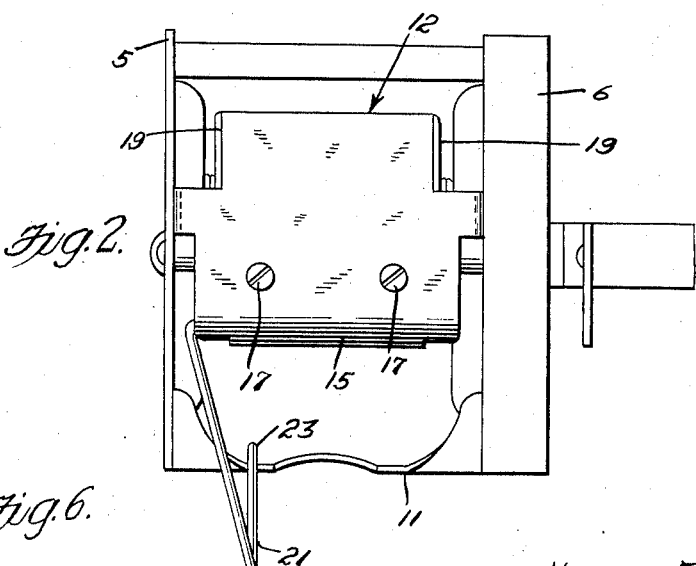
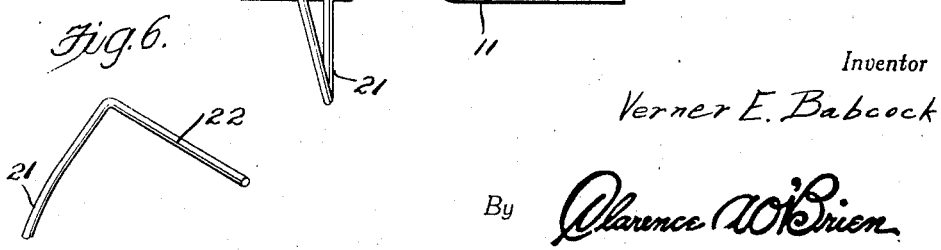
Inventor
Verner E. Babcock
By Clarence A. O'Brien
Attorney Patented Sept. 30, 1941

2,257,521

UNITED STATES PATENT OFFICE 2,257,521

BACKLASH PREVENTER FOR FISHING REELS

Verner E. Babcock, Port Clinton, Ohio

Application November 1, 1940, Serial No. 363,941

1 Claim. (Cl. 242—84.5)

This invention appertains to new and useful improvements in fishing reel attachments and more particularly to a backlash preventer.

The principal object of the present invention is to provide a fishing reel attachment which will combine the abilities of a drag and backlash preventer.

Another important object of the invention is to provide a backlash preventer which will be substantially automatic in operation, affording an even tension against the line at all times while it is in use.

Other objects and advantages of the invention will become apparent to the reader of the following specification.

In the drawings:

Figure 2 is a rear elevation.

Figure 3 is a section on the line 3—3 of Figure 1.

Figure 6 is a fragmentary perspective view showing the upper portion of the spring.

Figure 1:
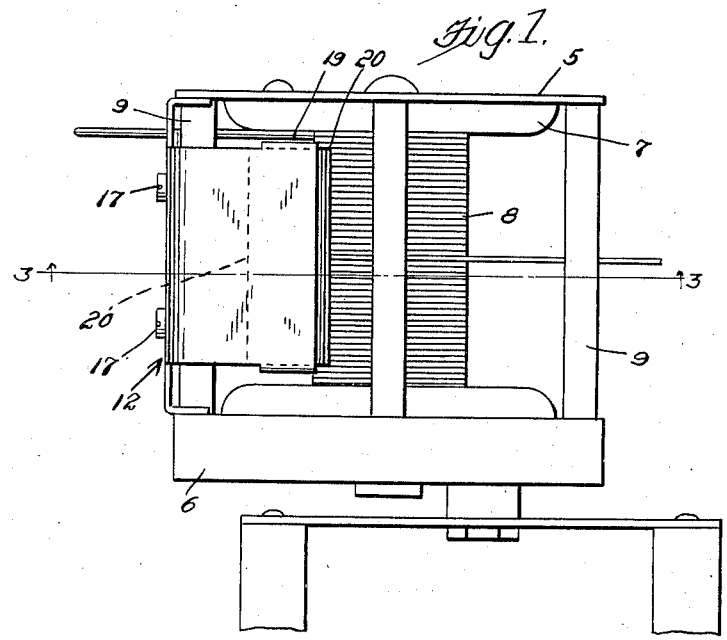
Figure 1 represents a top plan view.

Referring to the drawings wherein like numerals designate like parts, it can be seen in Figure 1 that numerals 5 and 6 denote opposite side portions of a reel between which is located a spool 7 on which a line 8 is wound. Spacer tubes 9 are interposed between the side portions 5 and 6 and through these spacer tubes 9 are disposed tie bolts 10. Numeral 11 denotes a bridge plate connecting the side portions 5 and 6 and this is usually found on fishing reels in one form or another.

Figure 4:
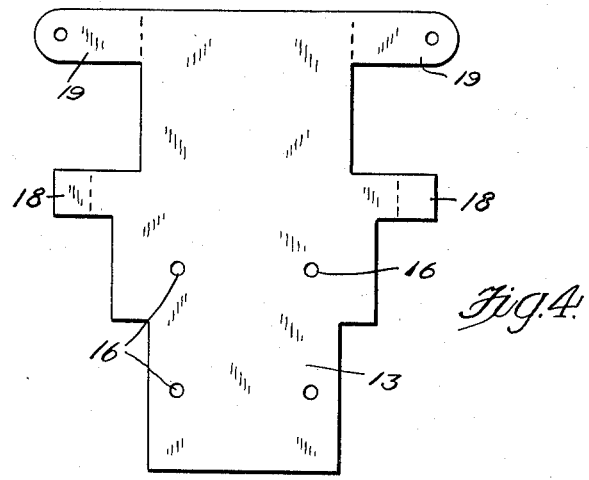
Figure 4 is a plan view of a blank from which a portion of the attachment is constructed.
Figure 5:
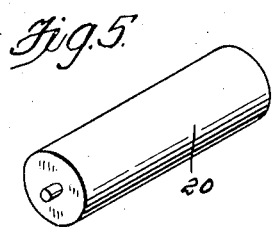
Figure 5 is a perspective view of the resilient roller.

The attachment is generally referred to by numeral 12 and the rocker feature of this attachment is constructed from a plate such as is shown in Figure 4. This plate has one end portion 13 bent back upon itself and formed to provide a channeled ledge 14 at its edge portion and a barrel 15 at its bent portion. The double ply arrangement is formed with threaded openings 16 and through these threaded openings screws 17 are disposed, as shown in Figure 3 and can be fed against the particular spacing tube 9 on which the attachment is mounted.

At the intermediate portion of the plate wing members 18 are provided and these are bent inwardly, as shown in Figure 3 to rest upon the spacer tube 9. It is preferable that these wings 18 extend laterally and then inwardly, and not only rest on the spacer tube 9 but also against the side structures 5 and 6 of the reel. Thus the attachment is well balanced.

The uppermost portion of the plate is curved inwardly and provided with depending ears 19 between which a resilient roller 20 is mounted.

To hold the roller 20 forced against the line on the reel 7, a wire spring 21 is provided and interposed between the aforementioned plate and the bridge member 11. This spring 21 is bowed and has a laterally disposed leg 22 at its upper portion disposed into the barrel 15. The other end of the spring 21 has a laterally disposed portion 23 which is bent backwardly as at 24 and then forwardly as at 25 in slight spaced relation with respect to the portion 24. This end portion of the spring is slipped over the bridge member 11 with the bridge member 11 interposed between the portions 24 and 25 as substantially shown in Figure 3.

It can now be seen, that the roller 20 is normally exerting pressure against the line 8. When greater pressure is desired as when a drag is desired on the spool 7, the fishermen can exert additional pressure by pressing with a thumb against the plate carrying the roller 20.

When use of this attachment is not desired, the plate can be swung rearwardly and the spring 21 will serve to hold the attachment in this inoperative position.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

An attachment for fishing reels comprising a resilient element and spring means for either holding the resilient element against the line on the reel or in displaced location with respect thereto.

VERNER E. BABCOCK.